(12) United States Patent
Bellofatto et al.

(10) Patent No.: US 8,001,401 B2
(45) Date of Patent: Aug. 16, 2011

(54) POWER THROTTLING OF COLLECTIONS OF COMPUTING ELEMENTS

(75) Inventors: Ralph E. Bellofatto, Ridgefield, CT (US); Paul W. Coteus, Yorktown Heights, NY (US); Paul G. Crumley, Yorktown Heights, NY (US); Alan G. Gara, Mount Kidsco, NY (US); Mark E. Giampapa, Irvington, NY (US); Thomas M. Gooding, Rochester, MN (US); Rudolf A. Haring, Cortlandt Manor, NY (US); Mark G. Megerian, Rochester, MN (US); Martin Ohmacht, Yorktown Heights, NY (US); Don D. Reed, Mantorville, MN (US); Richard A. Swetz, Mahopac, NY (US); Todd Takken, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 11/768,752

(22) Filed: Jun. 26, 2007

(65) Prior Publication Data

US 2009/0006873 A1 Jan. 1, 2009

(51) Int. Cl.
*G06F 1/26* (2006.01)
(52) U.S. Cl. ........ 713/320; 713/300; 713/310; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| 7,058,826 | B2* | 6/2006 | Fung ............................. 713/300 |
| 7,454,640 | B1* | 11/2008 | Wong ............................ 713/324 |
| 7,454,641 | B2* | 11/2008 | Connor et al. ................. 713/324 |
| 2003/0050714 | A1* | 3/2003 | Tymchenko .................... 700/21 |
| 2005/0283624 | A1* | 12/2005 | Kumar et al. ................. 713/300 |

* cited by examiner

*Primary Examiner* — Abdelmoniem Elamin
(74) *Attorney, Agent, or Firm* — Scully, Scott, Murphy & Presser, P.C.; Daniel P. Morris, Esq.

(57) ABSTRACT

An apparatus and method for controlling power usage in a computer includes a plurality of computers communicating with a local control device, and a power source supplying power to the local control device and the computer. A plurality of sensors communicate with the computer for ascertaining power usage of the computer, and a system control device communicates with the computer for controlling power usage of the computer.

21 Claims, 1 Drawing Sheet

POWER THROTTLING OF COLLECTIONS OF COMPUTING ELEMENTS

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; and U.S. patent application Ser. No. 11/768,682, for "HARDWARE PACKET PACING USING A DMA IN A PARALLEL COMPUTER".

FIELD OF THE INVENTION

The present invention relates to a control device and method of controlling a plurality of computers, and more specifically, centrally controlling power usage of a plurality of computers.

BACKGROUND OF THE INVENTION

Typical power saving mechanisms developed for computing systems only manage small numbers of processors in a system and do not generally interact with the environmental limitations of a room or data center. Systems such as BLUE GENE® are composed of collections of thousands of systems processors. This type of large collection of devices consumes so much energy that the environmental limitations of the room or data center which holds the system must be considered.

Further, typical computer system are built from a collection of parts which can vary widely in their power usage requirements, and thus large amounts of performance or power capabilities are left unused if the system is designed for the "worst case" scenario. This problem becomes more pronounced with systems that are constructed from a collection of devices.

Consider power dissipated by an electronic device can be described as $P=\frac{1}{2}C\,V_{dd}^2 f\,a$, where P is the power, C is the capacitance being switched, $V_{dd}$ is the power supply voltage, f is the clock frequency, and "a" is the switching activity factor, which is a fraction of the processor clock cycles that the circuit logic is actually activating and switching. Given that the capacitance is fixed by the design of the processor chip, the natural controls on power are power supply voltage and clock frequency. Current microprocessor power control mechanisms such as Dynamic Voltage Scaling (DVS) and Dynamic Frequency Scaling (DFS) employ these controls. However, computing systems and super computing systems, for example, BLUE GENE® have a single clock source controlling all chips throughout the system, which simplifies chip-to-chip communication. Thereby, it is a requirement that the frequency stays constant to maintain chip-to-chip communication integrity. Thus, Vdd has to stay above the minimum level that allows the communication functionality of the processor chips to keep up with the frequency requirement.

It would therefore be desirable to have an apparatus or method for controlling power in a computer system or plurality of computers or processors by affecting the switching activity "a". It would also be desirable for an apparatus or system to be scalable and safely operate at performance levels which are above the worst-case scenario design aspects. It would further be desirable for an apparatus and method to adapting to environmental characteristics of the room or data center which holds the computer system to safely maximize performance while staying within the limitations of the environment.

SUMMARY OF THE INVENTION

An apparatus for controlling power usage of a processing element in a computer system includes at least one processing element communicating with a local control device, and a power source supplying power to the local control device and the processing element. At least one sensor communicates with the processing element for ascertaining power usage data from the processing element. A system control device communicates with the sensor and communicates with the processing element for controlling power usage of the processing element using the data from the sensor.

In a related aspect, the local control device receives data from at least one local sensor for regulating power.

In a related aspect, the at least one processing element includes a computer.

In a related aspect, the system controlling device includes a memory device for storing a plurality of rules and a processor for executing commands for controlling the power usage of the processing element.

In a related aspect, the local control device receives data from at least one local sensor for regulating power, and the local control device compares the local sensor data to the rules received from the system control device.

In a related aspect, the processing element is a computer which includes a local memory device for storing on a computer readable medium the rules received from the system controlling device, and the computer includes a local processor for executing the rules.

In a related aspect, the processing element is part of a supercomputer system including a plurality of processing elements.

In a related aspect, the apparatus further includes a plurality of processing elements or computers in a network computing system.

In a related aspect, the system controlling device includes a program stored on a computer readable memory device for storing global policies and a processor for executing the program and distributing the global policies to a plurality of processing elements.

In a related aspect, the global policies are updated for a specified power requirement.

In a related aspect, the power requirement includes the power dissipation of a datacenter housing the plurality of processing elements.

In a related aspect, a plurality of local control devices receive data from a plurality of local sensors for regulating power of the plurality of processing elements and compare the local sensor data to safety thresholds.

In a related aspect, the local control device regulates switching activity of the processor element.

In a related aspect, the local control device regulates switching activity of the processing element by changing parameters of a memory access controller in the local control device.

In a related aspect, the local control device regulates switching activity of the processing element as part of a computer by changing a programmed instruction stream stored on computer readable medium for the processing element in the computer by inserting a no-operation or wait command.

In a related aspect, the rules include setpoints and thresholds.

In a related aspect, the rules are included in a program stored on a computer readable medium in the local control device and sent by the system control device.

In a related aspect, the apparatus further includes a job scheduler communicating with the system control device, and uses information from the job scheduler for updating the global policies and rules.

In a related aspect, the apparatus further includes a database communicating with the system control device. The database includes power characteristics for jobs, and the global policies on the system controlling device are updated using the power characteristics.

In a related aspect, the database is updated by the system control device with measured power characteristics of particular jobs.

In another aspect of the invention, a method of controlling power usage in a computer includes: providing a plurality of processing elements; connecting the plurality of processing elements with at least one local control device and a power source supplying power to the local control device and the processing elements; connecting at least one sensor to the processing elements; ascertaining power usage data from the processing elements using the sensor; and controlling power usage of the processing elements using a system control device communicating with the processing elements and the sensor.

In a related aspect, controlling the power usage of the processing elements includes changing switching activity of the processing elements.

In another aspect of the invention, a storage medium on which a program is stored to permit a computer to perform processing comprises the steps of: receiving data from at least one sensor communicating with at least one computer; determining whether power usage of the computer meets specified parameters; and controlling power usage by the computer.

In a related aspect, controlling the power usage includes changing switching activity of the computer.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
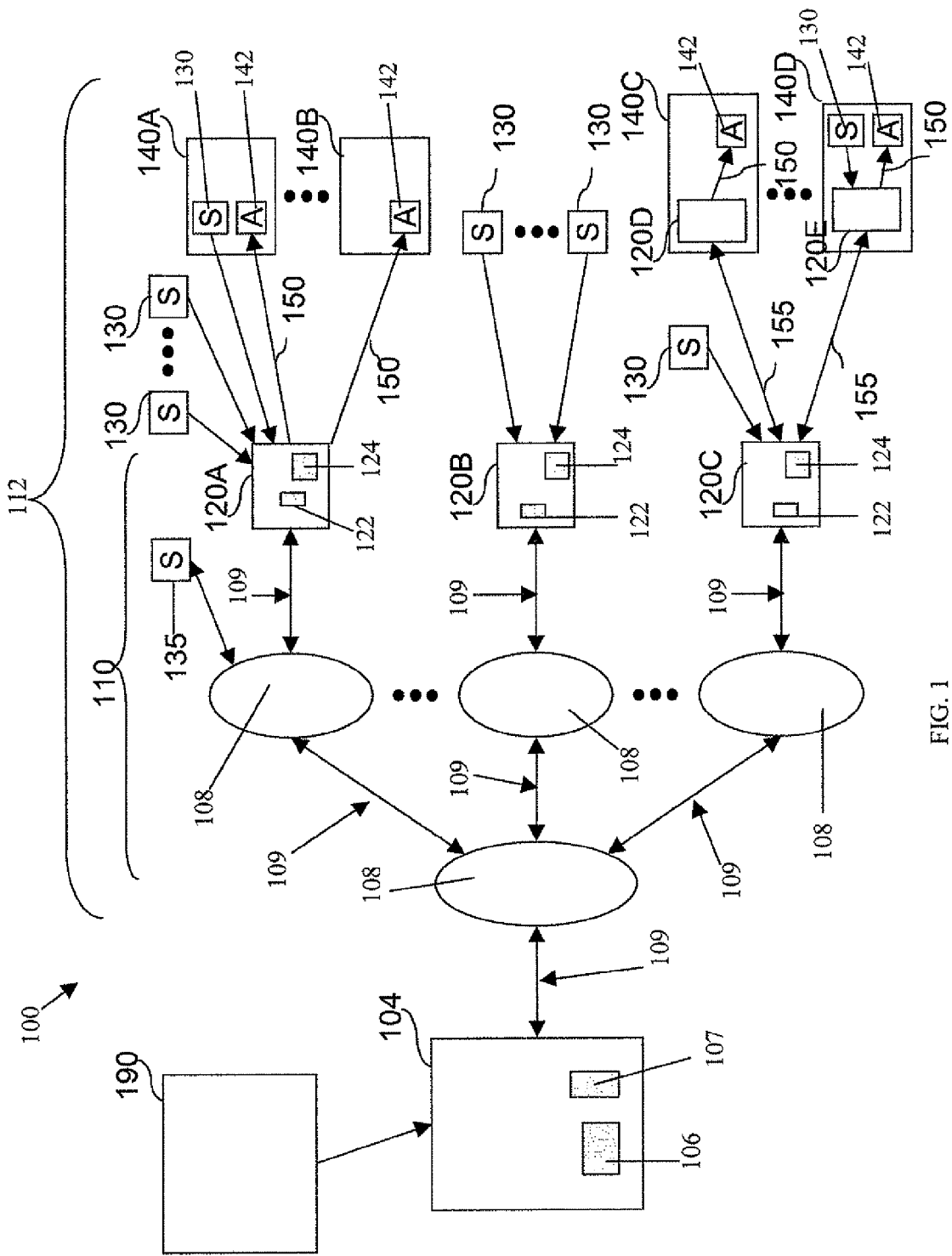
FIG. 1 is a block diagram depicting an illustrative embodiment of an apparatus for controlling a plurality of computers according to the present invention which includes, a system control device, a computer network, sensors, local control devices, and controlled devices.

An illustrative embodiment of an apparatus 100 for controlling power usage in a plurality of processors, or a supercomputer, or supercomputer system including a plurality of processors according to the present invention is shown in FIG. 1, and includes a plurality of control devices 120A-120E linked together in a network 110 comprising nodes 108. A node is defined herein as a point in a communication topology where data packets being carried through links 109 are rebuffered and arbitrated for the next stage. A node 108 may include, for example, a processor, a computer system, a server, or a router, and the nodes may communicate using a link hardware or software protocol. Nodes 108 are connected to the control devices 120A-120E and a system control device 104 by links 109. The illustrative embodiment of the present invention shown in FIG. 1 depicts, for example, one control device 120A linked to a node 108, however, other embodiments may include, for example, any specified number of nodes, and any specified number of control devices connected to the nodes. The plurality of control devices 120A-120E and network nodes 108 in the illustrative embodiment shown in FIG. 1 form the network 110 which is included in a supercomputer system 112. The supercomputer system 112 includes a plurality of sensors 130 communicating with the control devices 120A-120E which control processing elements embodied as local power-dissipating devices 140A-140D which may include, for example, processing chips or processors, or other power-dissipating devices which may also include, for example, field programmable gate array (FPGA) devices. The sensors 130 are placed strategically and communicate with the various devices to detect characteristics such as power usage and temperature of the various devices in the system and of the computing environment in general such as room or data center characteristics, for example, air temperature in a data center.

Additionally, control devices 120A-120E include processors 122 and memory storage devices 124 such that the control devices 120A-120E are programmed, to varying degrees, to react to local conditions as measured by local sensors 130. The control devices 120A-120E respond to local conditions by changing the operating characteristics of the local power-dissipating devices 140A-140D. Changing the operating characteristics of the controlled devices 140A-140D achieves a trade-off or balance between power usage and software application performance. This balancing process is called "throttling". The controlled devices 140A-140D include actuators 142 that receive a control signal 150 from the control devices 120A-120E, respectively.

Referring to FIG. 1, a number of variations of the apparatus 100 for controlling power usage are described. For example, control device 120A gathers local sensor 130 data and directly controls actuators 142 on the devices under its control via control signals 150. Controlled device 140A contains both a sensor 130 and an actuator 142. Controlled device 140B contains only an actuator 142. Controlled device 120B only gathers sensor 130 input data. A partial control device 120C gathers sensor 130 input data, and another partial control device 120D, having a distributed part of the control device function, is embedded in controlled device 140C, and a bidirectional data link 155 connects partial controllers 120C and 120D. Partial control device 120E is another example of partial control function distributed to a controlled device 140D, which contains both sensors 130 and actuators 142. While sensors 130 are interfaced to a specific type of controllers 120A-120E, it is also possible to attach appropriate sensors 135 directly to the nodes 108 of the network 110. Other variants can be constructed within the scope of this invention.

All controller devices 120A-120E are leaf nodes of the network 110. At the root of this network is a system controlling device embodied as a system controlling computer 104 for data collection and rule generation. The system controlling computer 104 includes the process of data collection and rules generation and collects and stores the information from the various sensors 130. The data may be promptly analyzed or analyzed over an extended period of time. Further, the data may be combined with known information about the construction of the supercomputer system 112 or network system and the environmental limitations of the data center or enclosed room, as well as, with information from the job scheduler 190. The data can also be used to generate operating rules which are sent to the controller devices 120A-120E. In an alternative embodiment, each controlled device may include a customized set of operating rules.

In the illustrative embodiment shown in FIG. 1, the process of data collection and rules generation runs on a system control device 104 which is a computer external to the supercomputer system 112. The system control device 104 includes a memory device 106 which may, for example, store a database, and a processor 107 for running the process of collecting data and generating rules. The system control device 104 is dedicated to controlling and administrating the supercomputer system 112, thus providing global control and policy over the supercomputer system 112 for controlling temperature/power using control devices 120A-120E. The network 110 may be, for example, a dedicated and private control network separate from any user network.

Additionally, a job scheduling device 190 communicates with the system controller 104. In one embodiment, information from the job scheduler 190 is used to build a library of power signatures of common jobs, which, for example, includes the power consumption of a controlled device for a particular job. This information is then used to set power thresholds for particular controlled devices or for specific partitions of the system while maintaining the desired average power of the supercomputer system 112 or a datacenter.

The local control devices 120A-120E are local controllers situated at leaf nodes of a control network, and are embodied as, for example, programmable microcontrollers or as field programmable gate array (FPGA) devices or, in cases 120D and 120E, as dedicated logic or processes in controlled devices 140C and 140D, respectively. The control devices 120A-120E compare the actual data gathered from the local sensors 130 and compare these with setpoints or thresholds set by the data collection and rules generation process of the system controller 104. The sensor data can be, for example, of an analog nature (such as the locally dissipated power), or of a digital nature (such as a bit which indicates a warning for overtemperature). The comparison of current data to setpoints and/or thresholds will result in control signals 150 to actuators 142 in the supercomputer's 112 controlled devices, i.e., processors 140. These actuators 142, may comprise a combined hardware/software system, work, in the illustrative embodiment shown in FIG. 1, by activating various interrupts to the controlled devices, i.e., processors 140.

In the present embodiment of the invention shown in FIG. 1, an interrupt command to one of the controlled devices, i.e., the processors 140A-140D implements remedial action. In particular, where the controlled parameter is power dissipation, and the monitored condition is the amount of power consumption, and too much power consumption or over-temperature initiates action, the remedial action is to slow down the processor in any of several ways. For example, to maintain processor-to-processor communication integrity, the supercomputer system 112 does not allow dynamic frequency scaling or dynamic voltage scaling. However, another way to decrease power dissipation is reducing the switching activity on a processor 140A-140D or chip. For example, the interrupt software can be used to change memory access parameters or to insert idles (no-ops) into the instruction stream.

Many computations lead to an irregular power consumption signature (power consumption, over time, of a particular device), thus, it is understood that the control devices 120A-120E) will allow for a specified time during power spikes before remedial action is taken. Thus, any given application will typically be allowed to ride through short duration power spikes exceeding desired or average power thresholds, as long as separate safety thresholds are not exceeded. A criteria accounting for hysteresis may also be deployed to maintain stability of power to the controlled devices 140A-140D.

An advantage of the present invention is that during the normal operation of the system, the control devices 120A-120E are able to take quick and accurate actions based on local sensor 130 data. This design eliminates the need to quickly transmit large amounts of measurement data to the system control device 104 to modify the data collection and rules generation and have operational orders returned to the local devices quickly. Thus, in the present invention, scalability is greatly enhanced while safety and usability is preserved by removing the need for a high bandwidth, low-latency link between the various components.

In another embodiment according to the present invention, the apparatus 100 for controlling power usage will allow and facilitate dynamic tradeoffs. For example, some partitions of the computer system can be allowed to run at higher power dissipation levels, or even temporarily exceed peak power thresholds, while other partitions operating at lower power dissipation levels. The system as a whole remains within the environmental envelope (e.g. cooling capacity) of the datacenter. The effectiveness of such trade-offs can be increased when the system control device 104 is enhanced by information from the job scheduling device 190 of the apparatus 100. For example, when repetitive jobs are being run, the system control device 104 can build a database of the power characteristics of each workload, and set rules (i.e. power and temperature thresholds) accordingly.

In another embodiment (not shown), the system control device 104 can combine with adaptive datacenter environmental controls, and, for example, if it finds that the supercomputer is being throttled too much, ask the power distribution and cooling to be stepped up temporarily to support the increased work load. Optimal control policies can thus be implemented that optimize data center performance while minimizing average power dissipation or the cost of operation.

Thus, the apparatus 100 of the present invention, provides remote sensors measuring power usage, environmental characteristics such as temperature, and have that information forwarded to a central collection and processing point, the system control device 104. This data can be combined with other information such as the characteristics of computer applications which are running on the system and globally determine rules for local implementation. Real-time decisions on how to limit power use or heat generation are sent to the remote components of the system for local execution, affecting the switching activity of the devices or processors 140A-140D. This provides the benefits of a global view of power management policy though the use of local devices. The resulting system is more scalable than a mechanism that requires both central collection and centralized control.

Thus, the apparatus 100 of the present invention may provide, for example, components, e.g., control devices 120A-120E, for measuring various characteristics of the devices which make up the computing system. These components measure physical characteristics such as power usage and temperature at the various devices in the system and the environment in general. Another type of component, e.g., control devices 120A-120E, which includes devices which can be programmed, to varying degrees, to react to local conditions and change the operating characteristics of the local controlled devices 140A-140D in some way which provides a different trade-off between energy usage and application performance. Another type of component, for example, the system control device 104 which includes a data collection and rule generating process and is connected via a network to the first two types of devices in the system. The collection and rules generating process collects and stores the information from the various measurement devices. This data, is often analyzed over extended periods of time, combined with known information about the construction of the system and the environmental limitations of the enclosing room are used to generate operating rules which are sent to the reactive devices in the throttling mechanism. It is possible for each device to have its own, customized set of operating rules.

During the normal operation of the apparatus 100, the local reactive devices, e.g., control devices 120A-120E, are able to take quick and accurate actions based on local data. This scalable design eliminates the need to quickly transmit large amounts or measurement data to the collection and decision section of the invention and have operational orders returned to the local devices quickly. By removing this need for a high bandwidth, low-latency patch between the various components in the invention scalability is greatly enhanced while safety and usability is preserved.

Thus, the apparatus 100 according to the embodiment shown in FIG. 1, includes remote sensors 130 measuring power usage, as well as environmental characteristics such as chip temperature, board temperature, fan speed, inlet and exhaust temperature or room temperature and have that information forwarded to the system control device 104 as a central collection and processing point. This data can be combined with other information such as the characteristics of computer applications which are running on the system. Globally determined rules from the system control device 104 are sent to the remote components of the system, for example, control devices 120A-120E, which then locally implement real-time decisions on how to limit power use or heat generation. This provides the benefits of a global view of power management policy though the use of local devices. The apparatus 100 is more scalable than a mechanism that requires both central collection and centralized control.

While the present invention has been particularly shown and described with respect to preferred embodiments thereof; it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An apparatus for controlling power usage of a processing element in a computer system, comprising:
   at least one processing element communicating with a local control device, and a power source supplying power to the local control device and the processing element;
   at least one sensor communicating with the processing element for ascertaining power usage data from the processing element;
   a system control device communicating with the sensor and communicating with the processing element for controlling power usage of the processing element using the data from the sensor;
   wherein the system control device includes a program stored on a computer readable memory device for storing global policies and rules, and the system control device includes a processor for executing the program, the program distributes the global policies to a plurality of processing elements;

a supercomputer system including the processing elements, and the system control device being external to the supercomputer system; and a job scheduler communicating with the system control device, and using information from the job scheduler for updating the global policies and rules.

2. The apparatus of claim 1, wherein the local control device receives data from at least one local sensor for regulating power.

3. The apparatus of claim 1, wherein the at least one processing element includes a computer.

4. The apparatus of claim 1, wherein the system controlling device includes a memory device for storing a plurality of rules and a processor for executing commands for controlling the power usage of the processing element.

5. The apparatus of claim 4, wherein the local control device receives data from at least one local sensor for regulating power, and the local control device compares the local sensor data to the rules received from the system control device.

6. The apparatus of claim 1, wherein the processing element is a computer which includes a local memory device for storing on a computer readable medium the rules received from the system controlling device, and the computer includes a local processor for executing the rules.

7. The apparatus of claim 1, further including a plurality of processing elements or computers in a network computing system.

8. The apparatus of claim 1, wherein the global policies are updated for a specified power requirement.

9. The apparatus of claim 8, wherein the power requirement includes the power dissipation of a datacenter housing the plurality of processing elements.

10. The apparatus of claim 9, wherein a plurality of local control devices receive data from a plurality of local sensors for regulating power of the plurality of processing elements and compare the local sensor data to safety thresholds.

11. The apparatus of claim 1, wherein the local control device regulates switching activity of the processor element.

12. The apparatus of claim 1, wherein the local control device regulates switching activity of the processing element by changing parameters of a memory access controller in the local control device.

13. The apparatus of claim 1, wherein the local control device regulates switching activity of the processing element as part of a computer by changing a programmed instruction stream stored on computer readable medium for the processing element in the computer by inserting a no-operation or wait command.

14. The apparatus of claim 4, wherein the rules include setpoints and thresholds.

15. The apparatus of claim 4, wherein the rules are included in a program stored on a computer readable medium in the local control device and sent by the system control device.

16. The apparatus of claim 1, further including a database communicating with the system control device, the database including power characteristics for jobs and the global policies on the systems controlling device being updated using said power characteristics.

17. The apparatus of claim 16, wherein the database is updated by the system control device with measured power characteristics of particular jobs.

18. A method of controlling power usage in a computer, comprising:

providing a plurality of processing elements;

connecting the plurality of processing elements with at least one local control device and a power source supplying power to the local control device and the processing elements;

connecting at least one sensor to the processing elements;

ascertaining power usage data from the processing elements using the sensor;

controlling power usage of the processing elements using a system control device communicating with the processing elements and the sensor;

storing a program on the system control device on a computer readable memory device for storing global policies and rules;

executing the program on a processor and distributing the global policies to a plurality of processing elements, the processing elements being part of a supercomputer system;

positioning the system control device external to the supercomputer system; and updating theglobalpolicies and rules using information from a job scheduler communicating with the system control device.

19. The method of claim 18, wherein controlling the power usage of the processing elements includes changing switching activity of the processing elements.

20. A computer readable storage medium on which a program is stored to permit a computer to perform processing and execute the steps of the program, the program comprising the steps of:

receiving data from at least one sensor communicating with at least one computer;

determining whether power usage of the computer meets specified parameters;

distributing a plurality of global policies and rules to the computer and a plurality of processing elements all being part of a supercomputer system;

controlling power usage by the computer using a system control device communicating with the computer,the plurality of processing elements, and the sensor, wherein the system control device is external to the supercomputer system; and updating the global policies and rules using information from a job scheduler communicating with the system control device.

21. The program storage device of claim 20, wherein controlling the power usage includes changing switching activity of the computer.

* * * * *